United States Patent [19]

Okor

[11] 4,127,849
[45] Nov. 28, 1978

[54] SYSTEM FOR CONVERTING CODED DATA INTO DISPLAY DATA

[76] Inventor: Joseph K. Okor, 516 Green St., Cambridge, Mass. 02139

[21] Appl. No.: 758,415

[22] Filed: Jan. 11, 1977

Related U.S. Application Data

[63] Continuation-in-part of Ser. No. 627,960, Nov. 3, 1975, abandoned.

[51] Int. Cl.² ............................................. G06K 15/20
[52] U.S. Cl. .............................. 340/324 AD; 358/182; 364/522
[58] Field of Search .................... 340/324 A, 324 AD; 364/522

[56] References Cited

U.S. PATENT DOCUMENTS

| | | | |
|---|---|---|---|
| 3,351,929 | 11/1967 | Wagner | 340/324 AD |
| 3,602,702 | 8/1971 | Warnock | 340/324 A |
| 3,778,810 | 12/1973 | Hayashi | 340/324 AD |

Primary Examiner—David L. Trafton
Attorney, Agent, or Firm—Morse, Altman, Oates & Bello

[57] ABSTRACT

The present invention relates to an improved data converter system that will accept the 3-D definition or description of a geometric object or symbol and convert it into a form suitable for display on a 2-D display device.

Once a symbol has been defined, it may be manipulated in several ways, a few of which are rotation of the symbol and moving the symbol from one location to another. Special effects may also be performed on the symbols on display, some of which include fade-in, fade-out and zoom. The data converter system also includes a video distributor that makes it possible to display the resulting picture of the symbols on a plurality of display devices each adapted to show part or all of the picture.

3 Claims, 37 Drawing Figures

OBJECT IN SPACE

VIEWING POINT

DISPLAY PLANE

VIEWING PLANE

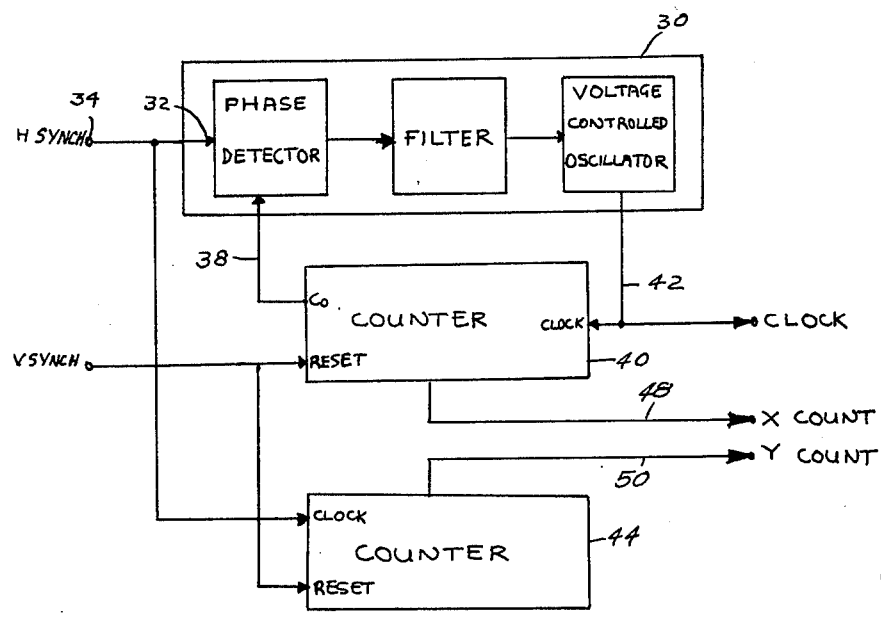
FIG. 3(A)
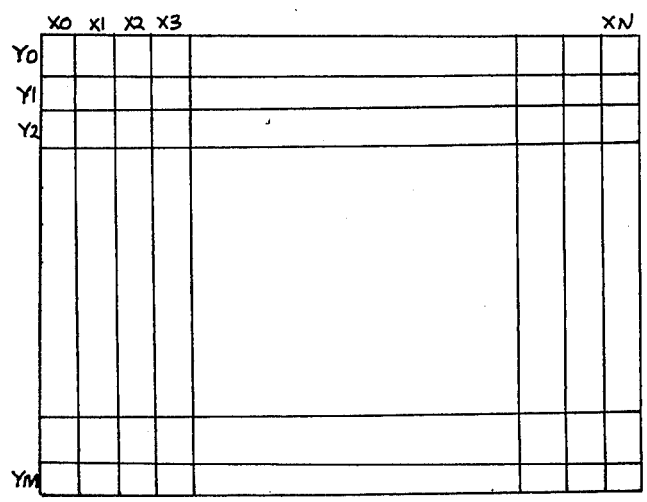
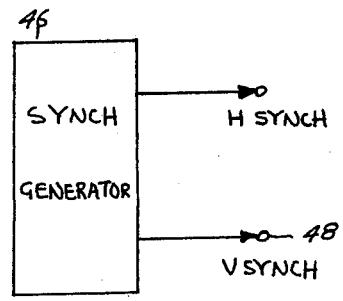
FIG. 3(B)
FIG. 4

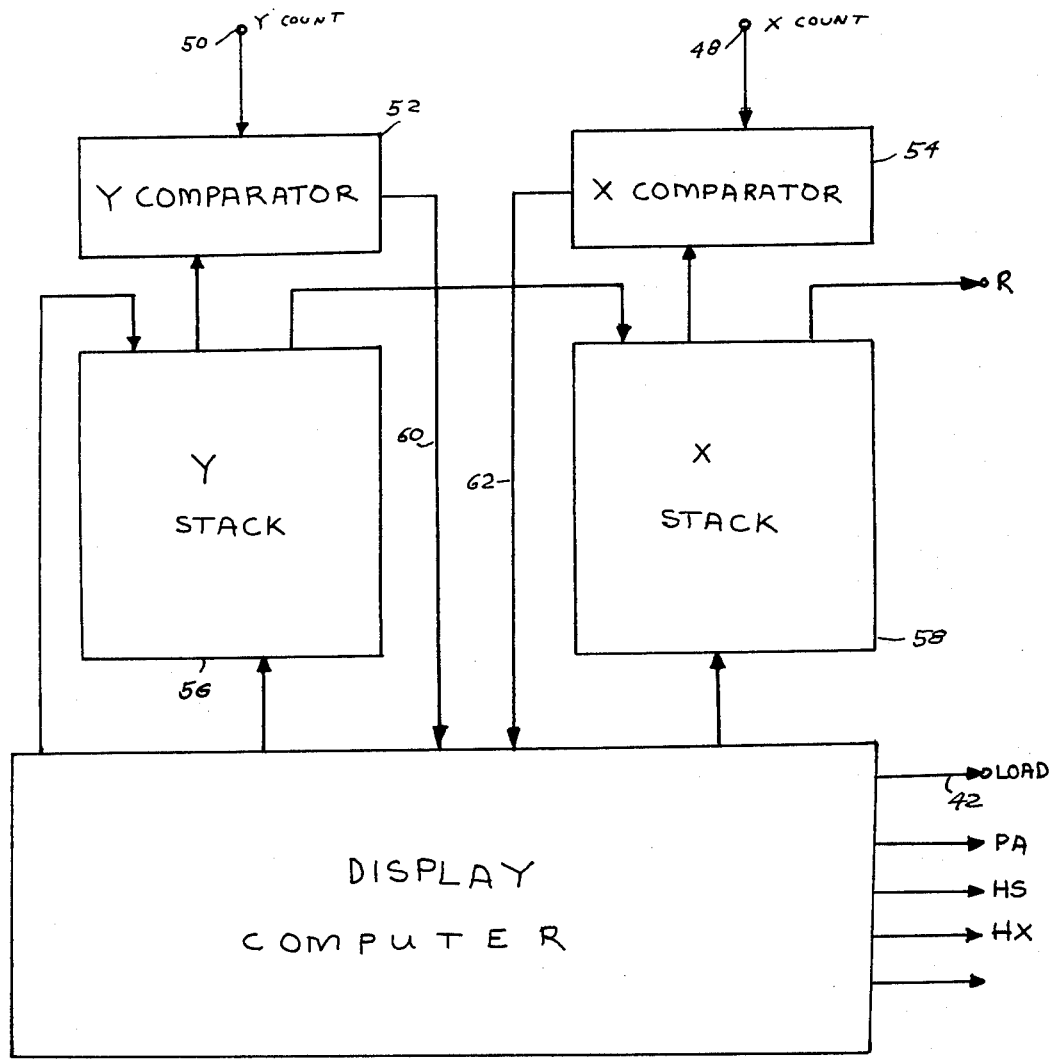
FIG. 5
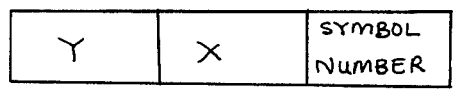
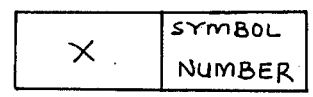
FIG. 7                    FIG. 6

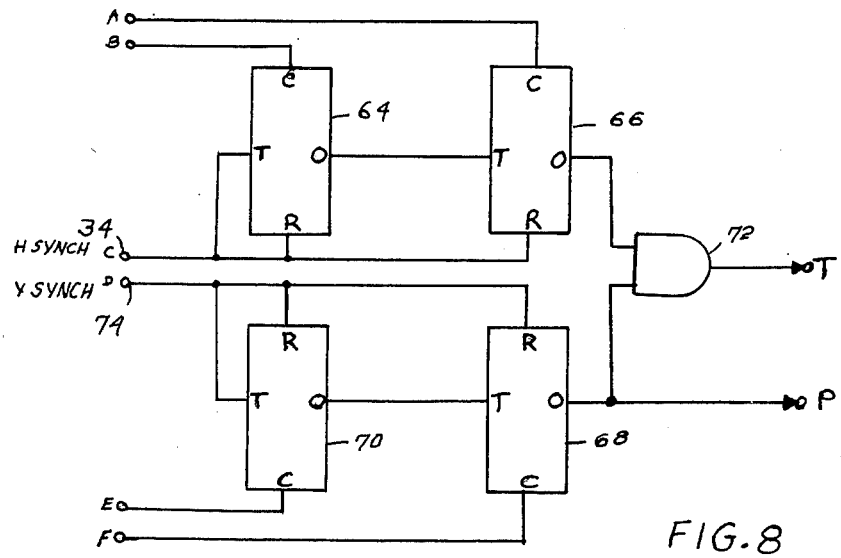
FIG. 8
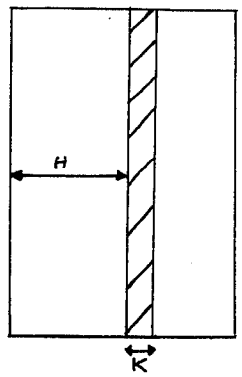
FIG. 9
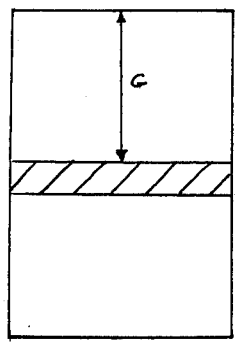
FIG. 10
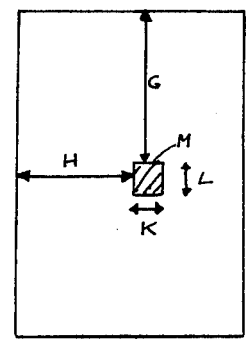
FIG. 11
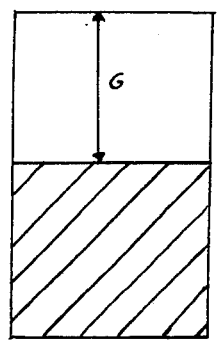
FIG. 12
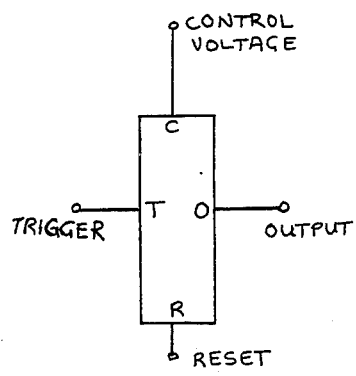
FIG. 13
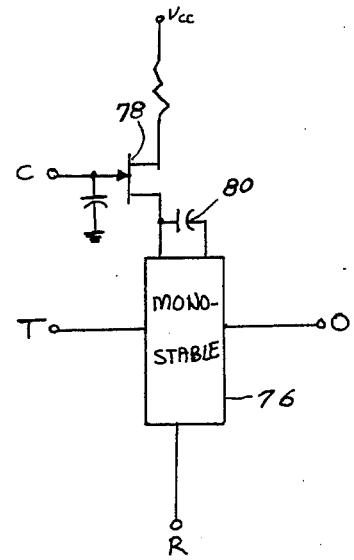

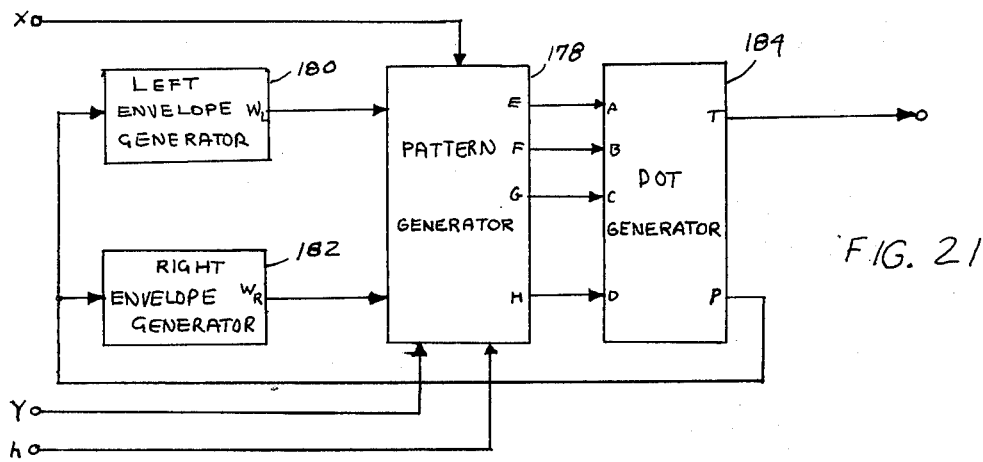
FIG. 21
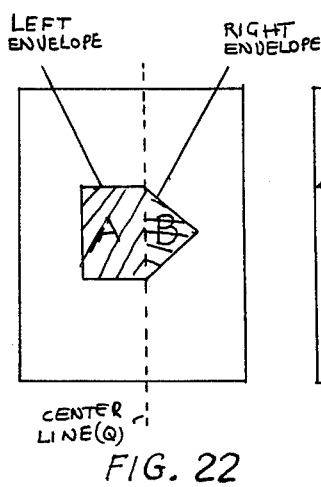
FIG. 22
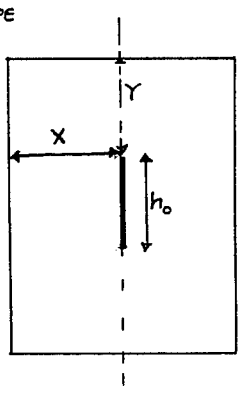
FIG. 23(A)
FIG. 23(B)
FIG. 23(C)
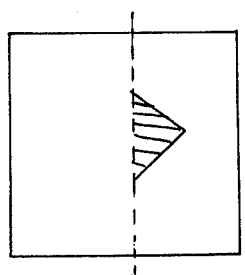
$a = -1 \quad b = 0$
$c = 1 \quad d = 0$
FIG. 23(D)
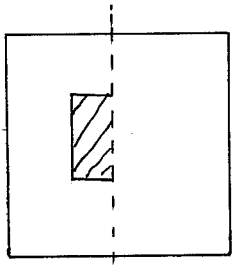
$a = 0 \quad b = 0$
$c = 0 \quad d = 1$
FIG. 23(E)
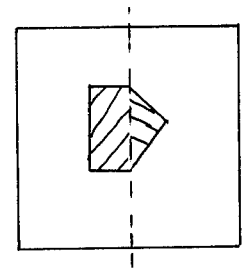
$a = -1 \quad b = 0$
$c = 1 \quad d = 1$
FIG. 23(F)
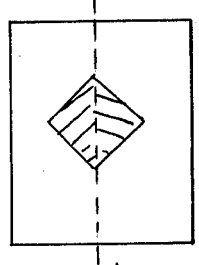
$a = 0 \quad b = 1$
$c = 0 \quad d = 2$
FIG. 23(G)
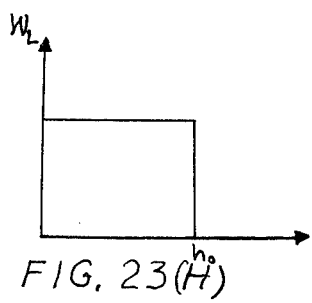
FIG. 23(H)
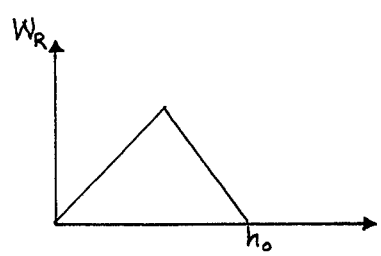
FIG. 23(I)

SYSTEM FOR CONVERTING CODED DATA INTO DISPLAY DATA

CROSS-REFERENCE TO RELATED APPLICATION

This is a continuation-in-part of my application entitled "Programmable Television Game System" filed Nov. 3, 1975, Ser. No. 627,960, now abandoned.

BACKGROUND OF THE INVENTION

1. Field of the Invention

This invention relates generally to data converting systems of the sort used to convert coded input data into display output data.

2. Description of the Prior Art

In recent years, there has been considerable interest in data converter systems. Some of the major areas of interest are computer animation, 3-D graphic display systems, etc., and a few data converters have come into use. In this prior art, either line-by-line plotting as in stroke writing display systems, or point-by-point plotting as in raster scan display devices have been used. The major disadvantage of the stroke writing systems is that they cannot plot fast enough to generate detailed pictures and most of them cannot display color directly. The line scan display devices can overcome the disadvantages of the stroke writing systems but require a considerable amount of memory to store the color information at each dot location.

Therefore, these prior systems were either too simple to handle the problem satisfactorily or too complex for most applications. Even the complex systems, because of the amount of data manipulation involved, have not been able to generate satisfactory real time computer animation.

It is an object of the present invention to significantly reduce the amount of memory required to store the description of symbols in a data converter.

It is another object of the present invention to provide means whereby the symbols may be readily manipulated in a data converter.

It is a further object of the present invention to provide means in a data converter whereby special effects such as fade-in, fade-out, etc., may be performed on the symbols on display.

It is a further object of the present invention to provide in a data converter means whereby the resulting picture of the symbol may be distributed to different display devices.

If each line of the raster of a line scan display is considered to be composed of a plurality of discrete dot elements, then the whole raster can be considered to be composed of a plurality of dot elements, and symbols can be formed on the line scan display by illuminating the proper dots with the proper color and intensity in a group of dots. This group of dots within which the symbol is formed is called a dot matrix. If the dots illuminated are consecutive with no blanks and of the same color and intensity for each line of the dot matrix, then we have a line segment matrix.

The data converter will, therefore, accept the 3-D description of the symbol and convert it into its dot matrix or line segment matrix equivalent suitable for display on a 2-D display device.

SUMMARY OF THE INVENTION

This invention features a system for converting coded data signals into display data signals, comprising a display computer adapted to store the matrix definition of each symbol, generate the address of each line of display and control other devices. The system also includes at least one dot generator connected to the computer, at least one symbol generator receiving inputs from the dot generator, a video combiner receiving inputs from the symbol generator and the computer and at least one display device receiving inputs from the symbol generator. The display computer receives input signals from an input computer receiving inputs from an input source and a symbol definer.

BRIEF DESCRIPTION OF THE DRAWINGS

FIG. 3(a) is a block diagram of a timing generator employed in the system, FIG. 3(b) is a block diagram of a synchronous generator employed with the timing generator of FIG. 3(a), FIG. 4 is a representation of a matrix grid corresponding to a display surface, FIG. 5 is a block diagram of a dot generator made according to the invention, FIGS. 6 and 7 illustrate the format of words as processed in the dot generator, FIG. 8 is a circuit diagram of a dot generator, FIGS. 9, 10, 11 and 12 are graphic displays demonstrating the operation of the dot generator, FIG. 13 is a circuit diagram of a voltage controlled monostable device employed in the system.

FIG. 21 is a block diagram showing another embodiment of the symbol generator, FIG. 22 is a graphic display of an arbitrary symbol generated by a symbol generator, FIGS. 23(a) through 23(g) are graphic displays showing the generation of different symbols from a basic envelope.

DETAILED DESCRIPTION OF THE PREFERRED EMBODIMENTS

Figure 1:
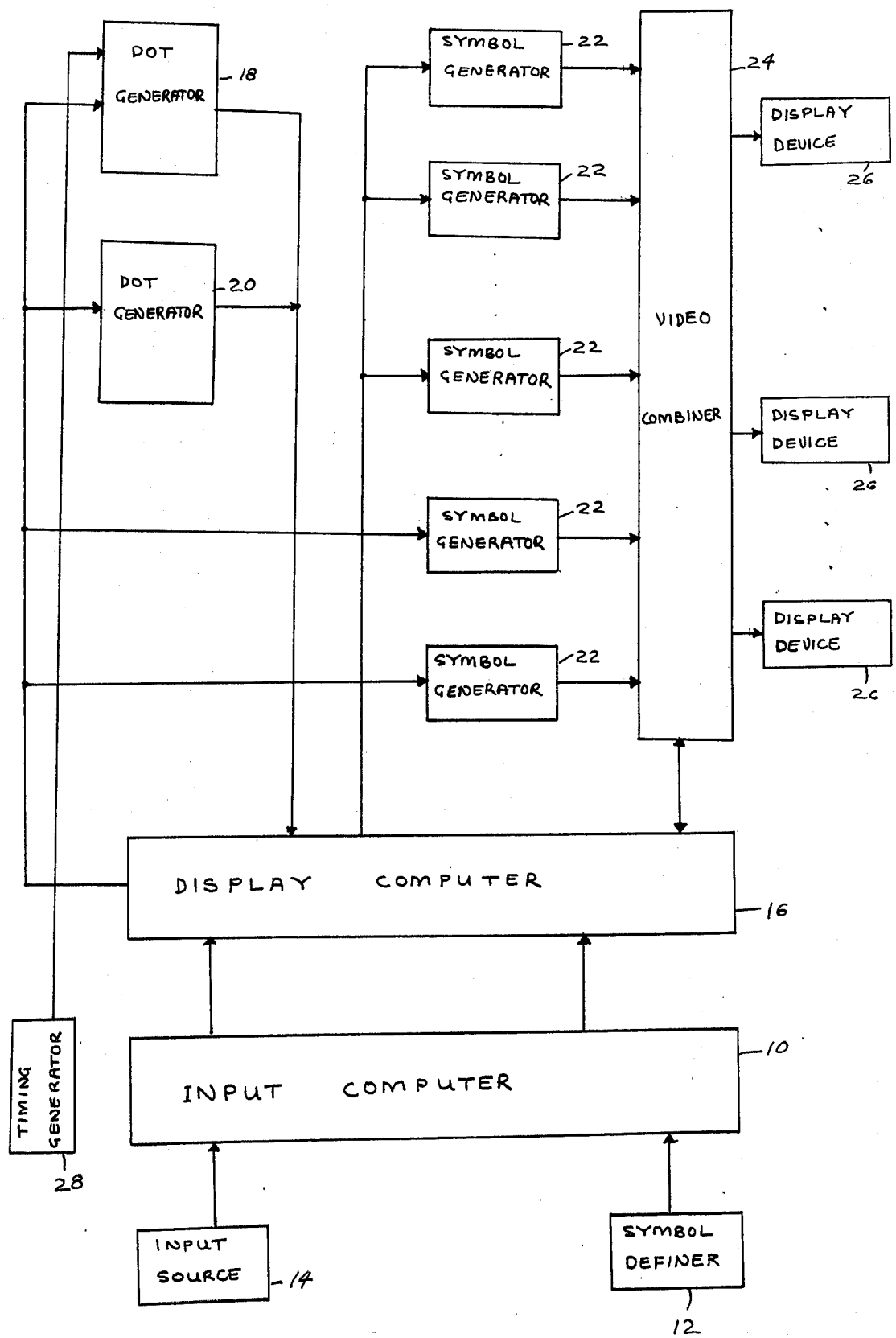
FIG. 1 is a block diagram of a symbol generator made according to the invention.

Referring now to the drawings and to FIG. 1 in particular, there is shown a block diagram of the preferred embodiment of the symbol generator. It consists of an input computer 10 which accepts the 3-D description of the symbols from a symbol definer 12, and with control information from an input source 14 it generates the 2-D representation suitable for a line scan display and other control information required to generate the symbol. This information is then connected to a display computer 16. The display computer 16 coordinates the activities of the other modules in the system. In particular, some of the output of the display computer 16 is connected to dot generators 18 and 20. These dot generators are adapted to generate a dot at the beginning of the horizontal position of each active symbol. Together with other information from the display computer 16, symbol generator 22 generates the symbols at locations indicated by the dot generator. The outputs of the symbol generator 22 are fed into a video combiner 24. With other control information from the display computer 16, the video combiner 24 produces special effects such as fade-in, fade-out, dissolve, etc. The video combiner 24 also acts as a video distributor in that it routes the output of each symbol to an appropriate display device 26 on which the given symbol is to be displayed.

The symbol definer 12 can be any source. It could be another computer, a body scanner, etc. Basically, the interest of the invention is in the 3-D description of the symbol.

The control source 14 determines which operations are to be performed on the symbol. The type of console functions determine the type of source. It may be an ordinary calculator keyboard from which it is possible to enter coordinates of where symbol is to be moved, or another computer which can be used to calculate the motion of the symbol.

A timing generator 28 generates all of the timing signals required to synchronize the display system.

Figure 2A:
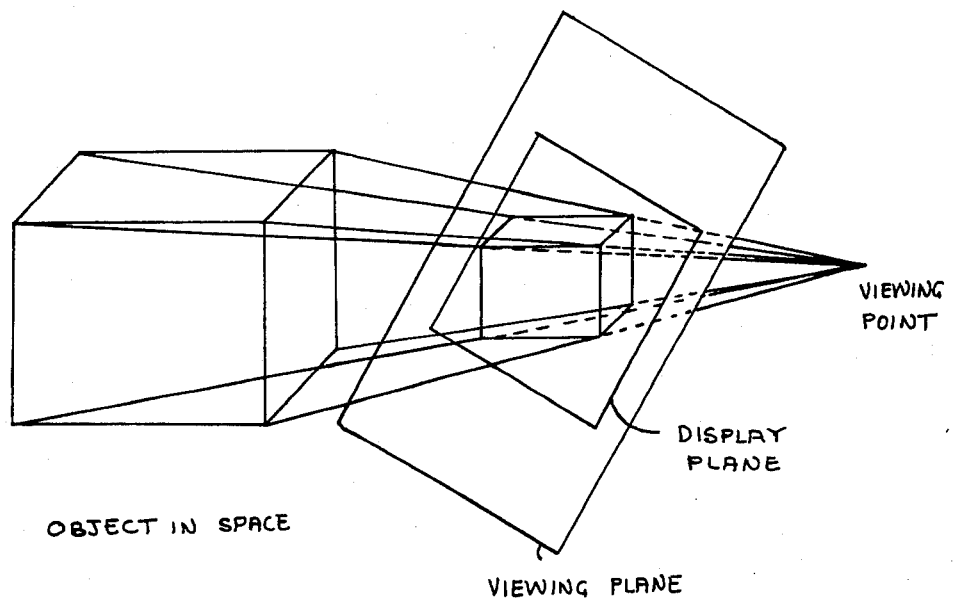
FIG. 2(a) is a view in perspective demonstrating certain visual aspects of the invention.
Figure 2B:
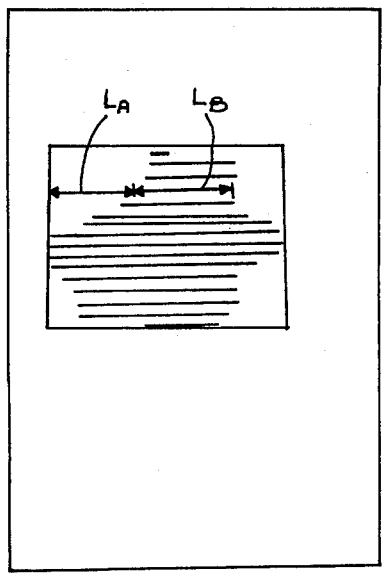
FIG. 2(b) is a view of a symbol displayed as a line matrix.
Figure 2C:
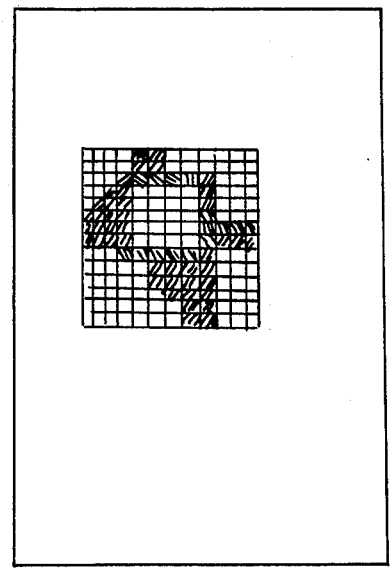
FIG. 2(c) is a view of a symbol displayed as a dot matrix.

Referring now to FIG. 2(b), there is shown a symbol displayed as a line segment matrix and in FIG. 2(c) there is shown a symbol displayed as a dot matrix.

Before a symbol could be displayed, it must first be defined. A symbol is defined by its 3-D dot matrix. Once the symbol has been defined in a 3-D space, to get a particular view of it, it is projected over a plane. This is obtained by drawing lines from the view point to each point of the object, and the points where these lines intersect with the viewing plane, as shown in FIG. 2(a), are the corresponding points. A collection of such points on the viewing plane forms a 2-D picture of the particular view of the 3-D object in space.

Like a camera, the amount of a scene projected onto the film plane is limited by the aperture of the lenes. In this case, the aperture is the size of the display screeen. Thus, if the size of the display screen is defined on the viewing plane, only symbols whose projection falls in this area of the viewing plane would be displayed. The input computer 10 generates the display ROM of the symbols from the projection of the symbols falling into this area of the viewing plane. The area defining the display screen moves along viewing plane as the viewing point moves along the viewing plane.

Since the symbols are defined as a 3-D matrix, it is possible, by mathematical manipulation, to find another matrix that would transform a 3-D matrix into its projection on a viewing plane.

Once a symbol has been defined, it can be moved around and rotated. The size of the symbol changes as it moves towards or away from the viewing point. Thus, for any operation performed on the symbol, a new display ROM of its projection on the viewing plane must be generated.

It should also be noted that once a symbol has been defined, it is necessary only to specify the $(x,y,z)$ coordinate of its origin and the coordinates of the other points defining the symbol could be generated by simple matrix addition.

The input computer 10 determines which format line segment or dot matrix format to use in defining the display ROM of each symbol. This decision is based on types of symbol generators available in the system.

The output of the input computer 10 is the matrix description of the symbol, location of the symbol, plus other control information required by the display computer 16 for use in generating the symbols. The symbol could be defined as a dot matrix or as a line segment matrix. In both cases, the display computer 16 accepts the matrix definition of the symbol and converts it into a display ROM. This usually involves converting the matrix into a linear array. The line segment matrix is already in the correct format, so the display ROM is generated directly by the method to be described.

If given a dot matrix with N rows and M columns, the steps involved in converting it into linear array are:

1. Add an extra column of EOL's where EOL is the control word for end of line. This step is used only when generating a display ROM for the symbol generator disclosed in FIG. 17.

2. Convert the matrix to linear array.

NM or (NM + N) words are needed to store the symbol definition. Each word contains the color at that matrix location.

A symbol is defined as a line segment matrix when the following conditions are all true.

1. The symbol has only one color. Thus, its dot matrix will consist of zeros and ones. A zero means no color at that location and a one means color at that location.

2. Any given row of the dot matrix is either:
 (a) all ones or all zeros, or
 (b) a string of ones followed by a string of zeros or vice-versa, or
 (c) a string of ones followed by a string of zeros followed by a string of ones or vice-versa.

The line segment matrix is generated as follows:

For each row of the dot matrix, beginning with the first row, the number of zeros is recorded in the string of zeros ($L_A$) preceding the first string of ones. The number of ones in the first string of ones ($L_B$) is then recorded.

The number of words required to store the line segment matrix definition of a symbol is equal to the number of rows in the dot matrix definition of the symbol.

Once the symbols have been defined, they are loaded into their respective ROM's. If more than one symbol is using the ROM, the ROM is organized as follows:

1. Each symbol $j$ is allocated $P_j$ consecutive words of memory where $P_j$ is the length of the linear matrix defining symbol. The computer stores the starting address (SA) of each symbol in the given ROM. The starting addresses of all symbols in a given ROM are related by the following expression:

$$SA_i = \sum_{j=P}^{i-1} P_j + SA\cdot \text{ where } SA\cdot = S\cdot$$

Where $S_o$ is an offset address into the ROM.

Once a symbol has been defined, the display computer 16 creates a file for each symbol and each file contains the following information:
1. Starting address in ROM (SA)
2. Present address is ROM (PA)
3. length of symbol (HS)
4. Width of symbol (VS)
5. Current width (CV)
6. Horizontal expansion factor (HX)
7. Color (C)
8. Vertical expansion factor (VX)
9. Current vertical expansion factor (CX)
10. Intensity (I)
11. Opacity (Q)
12. Priority (P)
13. Selector word (S)
14. Symbol number (R)

The priority (P) of a symbol is the order in which the symbols are located with respect to the observer. The nearest object has the highest prioity, and the farthest object, the lowest priority. If two or more opaque symbols project to the same location on the viewing plane, the symbol with the highest priority is displayed since an opaque object cannot be seen through.

Some special effects could be performed on the symbols on display irrespective of their priorities or whether the symbols are opaque or not. Some of these special effects are:

1. Fade in — The intensity of the symbol is gradually increased over successive frames until it reaches the assigned value of intensity.

2. Fade out — The intensity of the symbol is gradually described from the assigned value to zero over successive frames.

3. Dissolve — Over successive frames, the intensity of some of the symbols is gradually increased from zero until they reach their respective assigned values at the same time the intensity of some of the symbols is reduced until they reach zero intensity.

4. Zoom — The size of the symbol is gradually increased over successive frames until the assigned size is attained. This is achieved by varying the vertical expansion factor (VX) and the horizontal expansion factor (HX).

The rate at which the above operations are performed is controlled by the display computer 16.

If there is more than one display device, it is necessary to know on which display devices to display each symbol. The selector word (S) tells the video combiner 24 where each symbol is to be displayed. The length of the selector word (S) is equal to the number of display devices. If the bit at location $i$ of selector word (S) of symbol $j$ is one, then symbol $j$ could be displayed on display device $i$.

FIG. 3 represents in block diagram form the timing generator 28. The basic theory of the timing generator 28 as described here is as follows:

If each line of the raster of a line scan display is considered to be composed of a plurality of discrete dot elements, then the whole display surface can be considered to be composed of a plurality of dot elements, and the address of each dot element could be determined by finding the line number and the location of the dot on the given line. The display surface could therefore be regarded as an $x, y$ matrix as shown in FIG. 4.

The timing generator 28, as shown in FIGS. 3(a) and 3(b), consists of a phase locked loop device 30 of which one of the inputs 32 is a horizontal synch pulse 34 and the other input 36 is the overflow pulse on lead 38 of counter 40. Counter 40 is adapted to generate a pulse at lead 38 after N clock pulses where N is the number of discrete dot elements per raster line. The phase locked loop device 30 is adapted to generate a clock pulse at lead 42 whose frequency is N times the frequency at input lead 32. Counter 44 counts the number of lines per display surface. The scanning process is synchronized by two synchronous pulses from the synchronous generator 46. A vertical synch pulse 48 is used to reset counters 40 and 44 at the beginning of each frame-display surface. Output on lead 48 of counter 40 is the $x$ count and the output on lead 50 of counter 55 is the $y$ count. The $x$ count and the $y$ count give the location of the scanning head at any instant of time.

FIG. 5 represents in block diagram an embodiment of dot generator 18. The basic theory of the dot generator 18 is as follows:

At the beginning of each line, the $y$ address of every symbol using the dot generator 18 is compared with the $y$ count 50. If there is a match, the $x$ address and the symbol number of the symbol are loaded into a new file which is called the active file. For every clock pulse, the $x$ address of each symbol in the active file is compared with the $x$ count 48. If there is a match, one line of the matrix defining the symbol is generated. When all the lines of the matrix defining a given symbol have been generated, the symbol is deleted from the active file. The process described above is repeated until all the symbols have been generated.

The following methods could be used by the computer to determine when all the lines of the matrix defining a symbol have been generated.

1. A control word which indicates the end of the memory allocated to each symbol could be stored in the ROM which contains the definition of the symbol. When this word is detected, the symbol is deleted from the active file.

2. For each of the symbols, the computer stores the current vertical count (CV). This number indicates the number of lines in the matrix defining the symbol left to be generated. When this number is zero, the symbol is deleted from the active file. Initially it is zero. When the $y$ address of the symbol matches the $y$ count 50, at first this number is set to the width of the matrix (VS) defining the symbol. Any match thereafter reduces CV by one until zero.

From above, it can be seen that it is only necessary to store the address of the origin of the symbol.

The symbol could be expanded vertically by repeating each line of the matrix by an amount indicated by the vertical expansion factor VX. For every symbol, the display computer 16 stores the vertical expansion factor VX and the current vertical expansion factor CX. The current vertical expansion factor CS tells the computer how many times remaining for the given line to be repeated. Initially it is zero. At the beginning of each line, and for every active symbol, the computer performs the following calculation:

$$CX = CX - 1$$

if $CX = 0$ then $(VX = VX - 1\ CX = VX)$

In effect, if the current vertical expansion factor CX is zero, move to the next line of the matrix defining the symbol and reset the current vertical expansion factor CX to the expansion factor VX. This calculation could be performed explicitly by the computer or implicitly by the dot generator.

The dot generator 18, as shown in FIG. 5, consists of $y$ comparator 52, $x$ comparator 54, $y$ stack 56 and $x$ stack 58. The data in the $y$ stack 56 is ordered with respect to the $y$ address with the smallest $y$ address on top of the stack.

The dot generator operates as follows: At the beginning of each frame, the contents of the $x$ stack 58 are initialized to zero and the $y$ stack 56 is ordered as described above. The $y$ stack 56 can also be updated at this time too.

At the beginning of each line, the $y$ address at the top of stack 56 is compared with the $y$ count 58 by means of the $y$ comparator 52. If they are equal, as indicated by lead 60 becoming active, the computer 16 loads the portion of the word on top of the stack 56 with the format shown in FIG. 6 into the $x$ stack 58. The $y$ address of the word at the top of stack 56 is again compared with $y$ count 50, and the process described above is repeated until the $y$ address of word on stack 56 does not match $y$ count 50. The $x$ stack 56 is then ordered with respect to the $x$ address with the smallest $x$ address on top of $x$ stack 58.

For every clock pulse, the $x$ address at the top of the stack 58 is compared with the $x$ count 48 with the help of the $x$ comparator 54. If the $x$ address is equal to the $x$ count indicated by a lead 62 becoming active, the computer 16 transmits all relevant information required to generate one line of the matrix defining the symbol whose number is at the top of stack 58 to the selected symbol generator. The process described above is repeated until no $x$ address matches $x$ count in which case the computer 16 waits until the next clock pulse.

The number of words in the $x$ stack 58 at any given time varies from zero to the number of symbols on display.

The computer also performs the following calculations:

Beginning of each line:
For each symbol active, i.e., appears in $x$ stack 58

$CV = CV - 1$ if $CV = 0$ then delete symbol from active symbol file
else $(CX = CX - 1)$ if $CX = 0$ then $(CX = VX\ PA = PA - HS)$ Beginning of each frame:

$PA = SA$ $CV = VS$ $CX = VX$

The symbol could also be expanded horizontally by dividing the clock used in controlling the symbol generator by the horizontal expansion factor HX.

Referring now more particularly to FIG. 8, there is disclosed the circuitry for generating a dot graphically displayed in FIG. 11. The dot generator includes four voltage controlled monostable devices 64, 66, 68 and 70, plus an AND gate 72. The horizontal synch pulse 34 from the timing generator 28 is employed to clear the monostable device 64. The monostable device 64 is adapted to generate a pulse of width H proportional to the input voltage at A.

The output of the monostable device 64 is used to trigger the monostable device 66 to generate a pulse of width K proportional to the input voltage B. If only the output of the monostable device 66 is displayed, a strip of width K located at H units from the left of the screen and stretching from bottom of the screen will appear on the screen. In a similar manner, the output of the vertical synch lead 74 from the timing generator 28 is used to clear the monostable devices 68 and 70 and to trigger the monostable device 68 which generates a pulse of width G. The output of the monostable device 68 is used to trigger the monostable device 70 to generate the pulse of width L proportional to the control voltage Z. If only the output of the monostable device 68 is displayed, a strip of height L, spaced G units from the top of the screen and stretching from the left-hand side of the screen to the right-hand side of the screen, will appear on the screen as in FIG. 10. When the outputs of the monostable devices 66 and 68 are connected to the AND gate 72, the output T is a rectangular block of width K and height L located at G units from top of the screen and H units from the left-hand side of the screen, as in FIG. 11. FIG. 12 shows the output of monostable device 68.

The control voltage at A, C input can move the rectangle M to any part of the screen, and the control voltages B and D determine the size of the rectangular dot M.

Referring to FIG. 13, there is shown the circuitry of a voltage controlled monostable device. It consists of monostable device 76 in which the timing resistor is replaced by a voltage controlled resistor 78. In this embodiment, the voltage controlled resistor is an FET (field effect transistor) but other forms of voltage controlled resistor could be used. A timing capacitor 80 can also be replaced with a voltage controlled capacitor.

Figure 14:
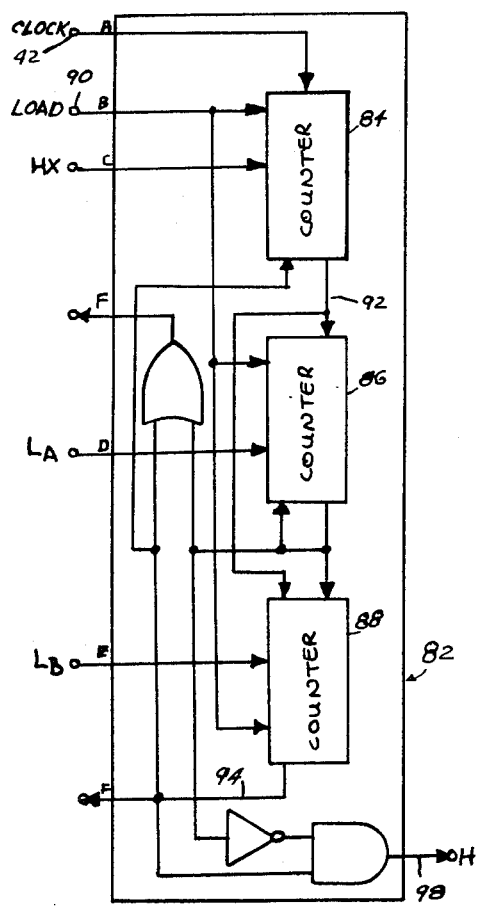
FIG. 14 is a block diagram of a counter employed in the system.

Referring to FIG. 14, there is shown a block diagram of a counter circuit 38. It consists of counters 84, 86 and 88.

When the load signal on lead 90 is active, counter 84 is loaded with the horizontal expansion factor HX, counter 86 with the number of zeros in the string of zeros $L_A$, and counter 88 with the number of ones in the string of ones $L_B$. Counter 84 is adapted to divide the input clock 42 by HX. The overflow pulse on lead 92 of counter 84 is used to clock counters 86 and 88. The output on lead 94 of counter 88, when active, is used to disable counters 84 and 86.

In operation, counter 84 divides the input clock by HX. The overflow pulse on lead 92 is used to clock counters 86 and 88. Counter 86 counts $L_A$ clock pulses and the overflow pulse on lead 96 is used to disable counter 86 and to enable counter 88. Counter 88 counts $L_B$ clock pulses and the output on lead 94 is used to disable counter 84. The output on lead 98 is active only when counter 88 is counting and counter 86 is not counting. This tells the color generator to generate the color at those locations where lead 98 is active. When the output on lead F is active the counter 82 is active.

Figure 15:
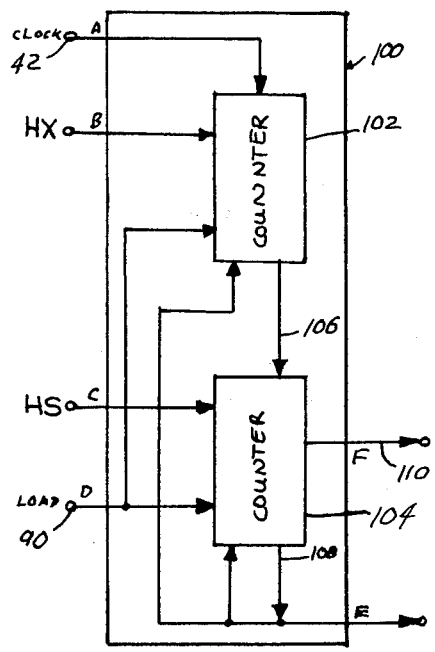
FIG. 15 is a block diagram of another counter employed in the system.

Referring now to FIG. 15, there is a block diagram of the preferred embodiment of a counter circuit 100. It consists of a counter 102 and a counter 104. When the load signal on lead 90 is active, the horizontal expansion factor HX is loaded into counter 102 and the width HS is loaded into counter 104.

In operation, counter 102 is adapted to divide the input clock 42 by HX. The overflow pulse on lead 106 is used to clock counter 104. Counter 104 is adapted to count HS pulses. After HS clock pulses, signal on lead 108 becomes active and this is used to disable counters 102 and 104. The outputs on lead 110 is the dot number of on the line of the dot matrix being displayed.

Figure 16:
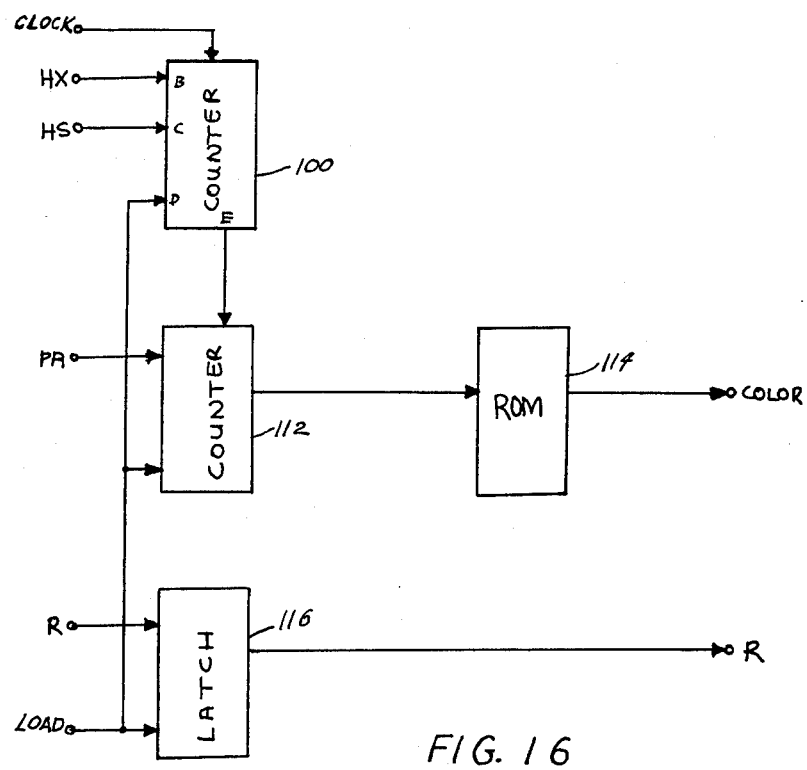
FIG. 16 is a diagram of a symbol generator made according to the invention.

Referring now to FIG. 16, there is illustrated thereby schematically one embodiment of the symbol generator.

It consists of counter circuit 100, counter 112, ROM 114 and latch 116. The operation of counter 100 is outlined in FIG. 14. When a symbol is to be generated using this symbol generator, counter 100 is loaded with the horizontal expansion factor (HX) and length (HS), counter 112 is loaded with the present address (PA) and latch 116 is loaded with the symbol number (R). The overflow output of counter 100 is used to clock counter 112. Basically, counter 100 is adopted to divide the input clock by the horizontal expansion factor (HX) and also to make sure that the number of words read from the ROM 114 is equal to the length (HS) of the dot matrix defining the symbol. The output of counter 112 is used to address ROM 114. The output of ROM 114 gives the color of each dot in the dot matrix defining the symbol. Latch 116 stores the symbol number (R) so that the video combiner 24 can be able to tell the source of the data.

After one line of the dot matrix defining the symbol has been generated, the counting stops until activated again to generate another line. The process is repeated on each line until all the lines of the dot matrix have been displayed.

Figure 17:
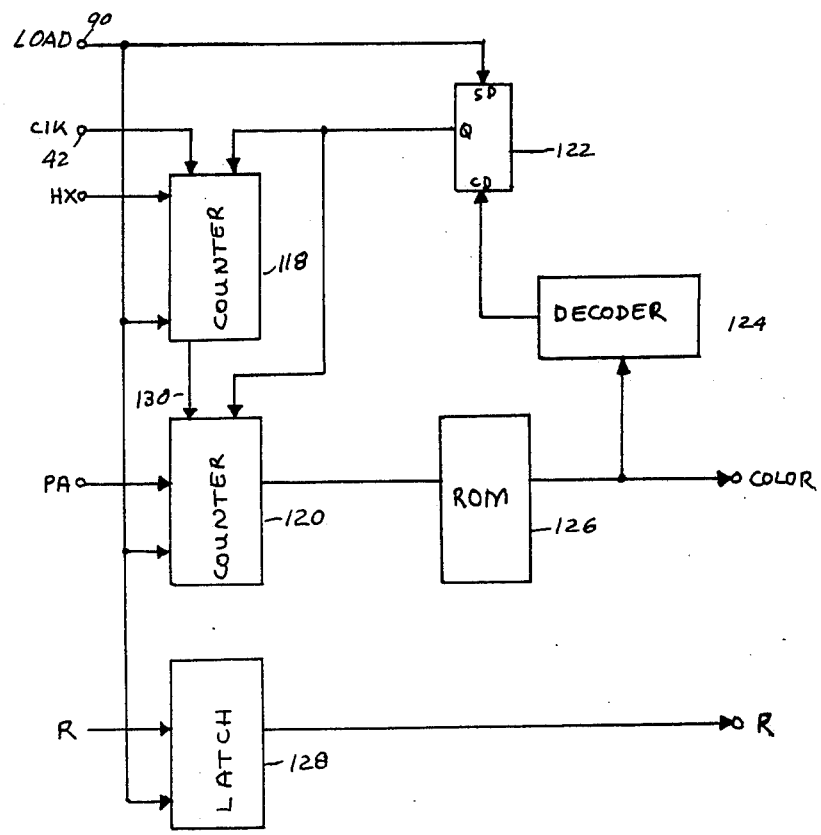
FIG. 17 is a diagram of a modified symbol generator.

Referring now to FIG. 17, there is illustrated another embodiment of the symbol generator consisting of counters 118 and 120, latch 122, decoder 124, ROM 126 and latch 128. When a symbol is to be generated using this symbol generator, counter 118 is loaded with the horizontal expansion factor (HX), counter 120 with the present ROM address (PA), and latch 128 with the symbol number (R). The load signal 90 is used to enable latch 122 which in turn enables counters 118 and 120. Counter 118 is adapted to divide the input clock 42 by the horizontal expansion factor (HS). The overflow pulse on lead 130 of counter 118 is used to clock counter 120. The output of counter 120 is used to address the ROM 126. The output of the ROM 126 gives the color of each dot in the dot matrix defining the symbol. The decoder 124 is constantly decoding the output of the ROM 120. If it detects a word which indicates the end of line (EDL) it disables the latch 122 and consequently stops the counting operation. Thus, when enabled, the symbol generator will generate one line of the dot matrix defining the symbol. The starting address of the line to be generated is loaded into the counter 120 by the load signal 90.

After one line of the dot matrix defining symbol has been generated, the counting stops until activated again to generate another line. The process is repeated on each line until all the lines of the dot matrix have been displayed.

Figure 18:
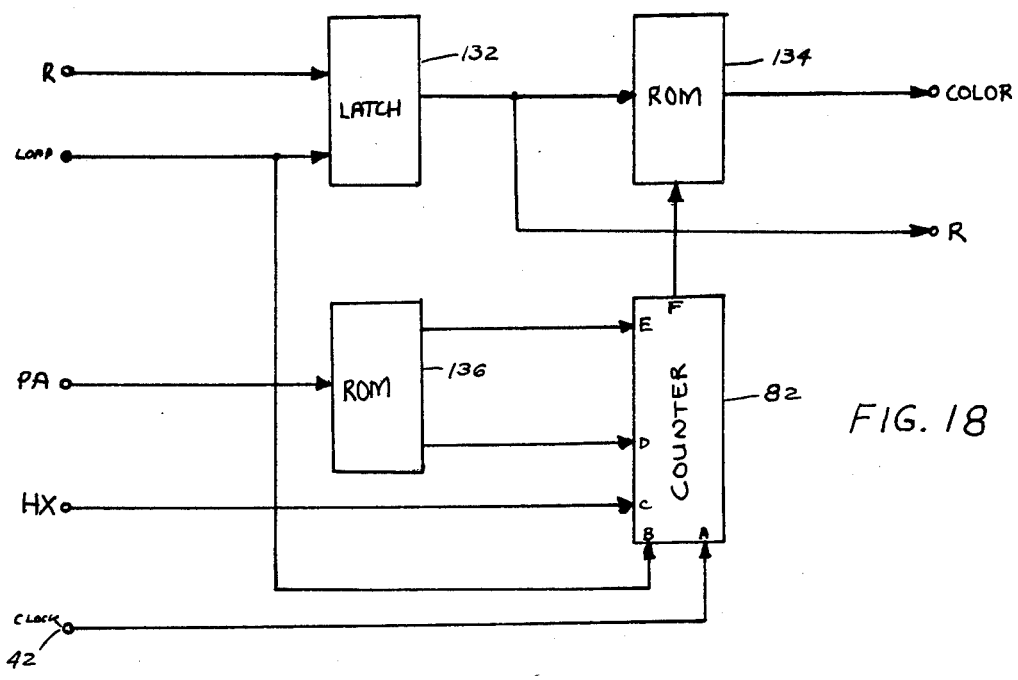
FIG. 18 is a diagram showing another modification of the symbol generator.

Referring now to FIG. 18, there is illustrated another embodiment of the symbol generator suitable for a line segment matrix. It consists of a latch 132, an ROM 134, an ROM 136, and a counter 82. When a symbol is to be generated using this symbol generator, the latch 132 is loaded with the symbol number (R), the counter 82 is loaded with the horizontal expansion factor (HX), and the word at location indicated by present address (PA) in the ROM 136. The operation of counter 82 is more fully disclosed in FIG. 14. The output of the counter 82 at lead F is used to control the ROM 134. If the output on lead F is active, then the word in the ROM 134 addressed by the contents of the latch 132 gives the color of the symbol. Basically, all symbols defined by line segment matrix are solids with no enclosed blanks and can have only one color. The color of the symbol is stored in the ROM 134.

When enabled, the symbol generator will generate one line of the line segment matrix defining the symbol. The address of the line is the present ROM address (PA).

After one line of the matrix has been displayed, the symbol generator is disabled until activated again to generate another line. The process is repeated on each line until all the lines have been displayed.

The symbol generators described in FIGS. 10, 11 and 12 cannot be used to generate simultaneously two or more overlapping symbols. This is because when it is desired to generate a symbol, the previous data is overwritten irrespective of whether another symbol is being generated, thus, making it impossible to continue generating the old symbol when the new symbol is finished. The above problem can be solved by providing a plurality of counters and registers so that if it is desired to generate a new symbol while another symbol is being generated, all that is done is to switch counters and registers. When the generation of a symbol is finished, a check is made to see if some other symbol is ready to be generated. If yes, then the corresponding counter-register set is connected to the symbol generator. Since it is very unlikely that all symbols on display would overlap at any given position on the display surface, it is not necessary to provide a counter-register set for each symbol. It is only necessary to provide enough counter-register sets so as to be able to handle the largest possible overlap. In effect, resources are shared. To do this, a mapping function is needed which, when given the symbol number, provides the address of a counter-register set. The mapping function should also be reversible in that given the current counter-register set it is possible to determine which symbol is using that counter-register set.

The order in which the symbols are generated when two or more symbols overlap is determined by their priority. Thus, if two symbols overlap, the symbol nearest to the observer should be displayed instead of the other symbol. With this type of display all symbols behave as if they are opaque.

It is also possible to solve the problem by using two or more symbol generators and making sure that the same symbol generator is not used to generate overlapping symbols.

Figure 19:
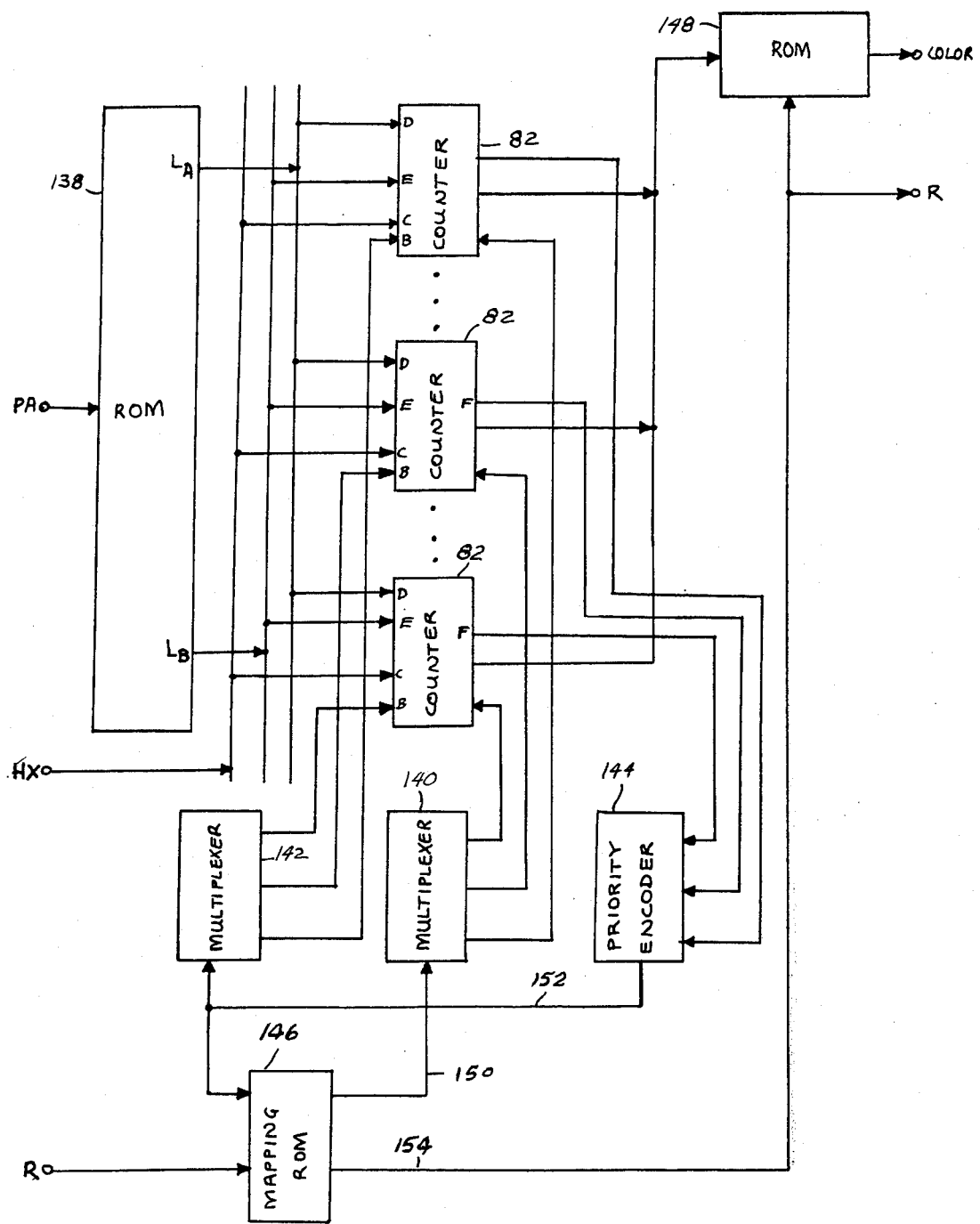
FIG. 19 is a block diagram of yet another symbol generator.

Referring now to FIG. 19, there is illustrated another embodiment of a symbol generator suitable for generating overlap symbols defined by a line segment matrix.

It consists of an ROM 138, a counter 82, multiplexers 140 and 142, priority encoder 144, ROM's 146 and 148. When a symbol is to be generated using this symbol generator, counter 82 is loaded with the horizontal expansion factor (HX) of the symbol and the word at the location addressed by the present ROM address (PA) in the ROM 138. The operation of the counter 82 is outlined in FIG. 14. The counter selected is determined by the ROM 146 given the address of a symbol. The ROM 146 will generate on lead 150 the address of the counter to use. The signal on the lead 150 is decoded by the multiplexer 142 to select the correct counter. Once a counter is selected, it continues counting even if it is not being used to generate a symbol until the end of its count. The priority encoder 144 selects which counter 82 to use in generating the symbol. In operation, the output line F, which indicates whether a counter is counting or not counting of each counter 82, is connected to the priority encoder 144. The priority encoder 144 generates the address of the counter with the lowest priority amongst the active counters. The address on lead 152 is decoded by the multiplexer 140 to select the counter that should be used to generate the symbol. The output of the lead 152 is connected to the ROM 146. The output of the ROM 146 on lead 154 gives the address of the symbol using the counter whose address is on the lead 152. Lead 154 is connected to the ROM 148 to generate the color of the symbol.

When a symbol of higher priority is to be generated or the symbol generator has finished generating this symbol, a new address is generated on lead 152 and the process repeated until all the symbols have been generated.

Figure 20:
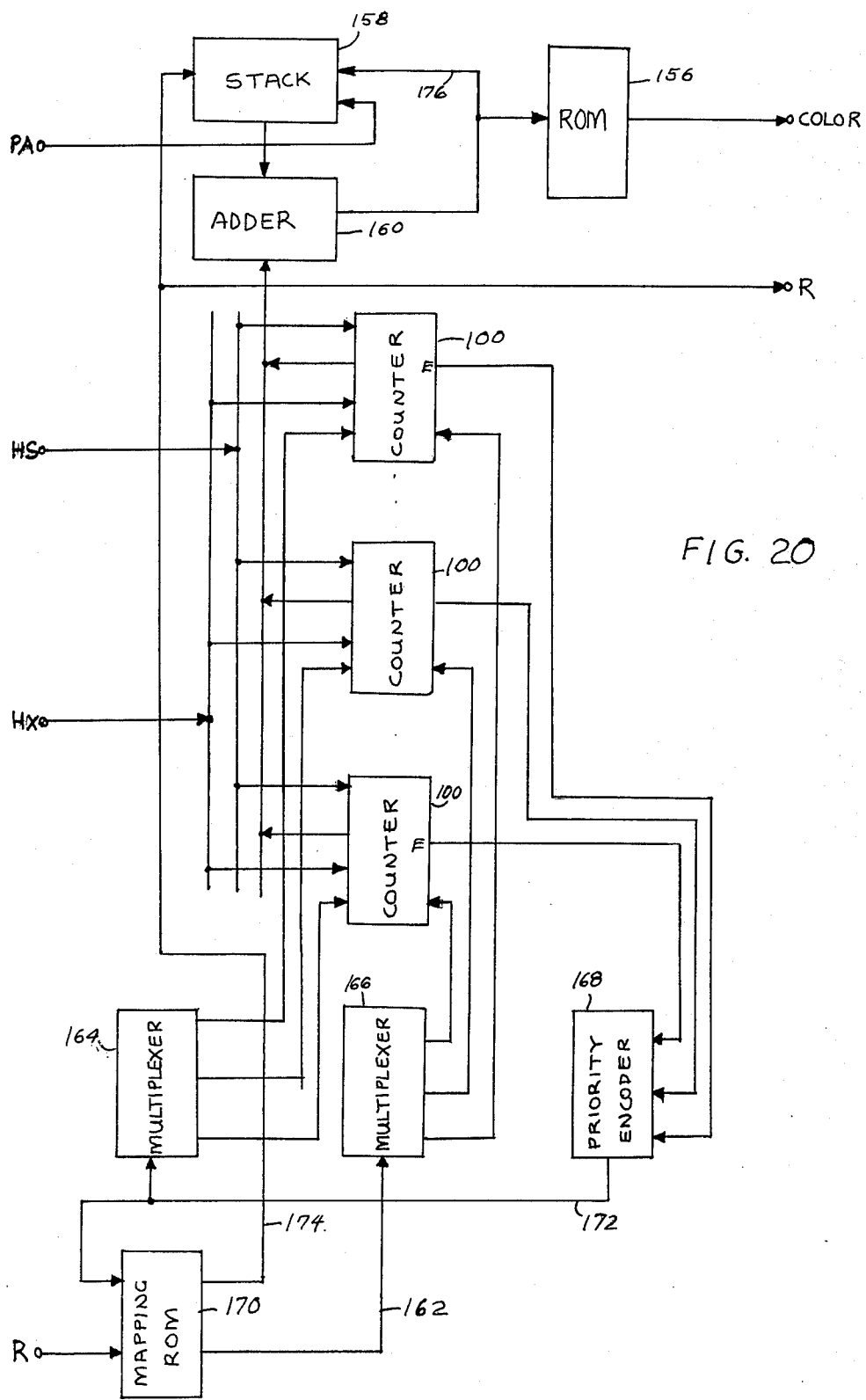
FIG. 20 is a block diagram of a symbol generator suitable for generating overlap symbols defined by a dot matrix.

Referring now to FIG. 20, there is illustrated an embodiment of a symbol generator suitable for generating overlap symbols defined by a dot matrix.

It consists of ROM 156, stack 158, adder 160, counters 100, multiplexers 164 and 166, priority encoder 168 and ROM 170. When a symbol is to be generated using this symbol generator, horizontal expansion factor (HX) and width (HS) of the symbol are loaded into counters 100, and the present ROM address (PA) of the symbol is loaded into the stack 158. The operation of the counter 100 is outlined in FIG. 15. The counter 100 selected is determined by the ROM 170. Given the symbol number (R), the ROM 170 will generate on lead 162 the address of the counter 100 to use in generating the symbol. The signal on lead 162 is decoded by the multiplexer 166 to select the correct counter 100. Once a counter 100 has been enabled, it continues counting until the end of its count. The priority encoder 168 is used to select the counter whose output should be used in generating the symbol. In operation, the output on lead E of each counter 100 is connected to the input of the priority encoder 168. The priority encoder 168 generates the address of the counter with the lowest priority amongst the active counters. The output on line 172 of the priority encoder 168 is the address of the counter with the lowest priority. Lead 172 is used to select which counter 100 output should be connected to the adder 160. Lead 172 is also connected to ROM 170 which, when given the number of the counter currently connected to adder 160, will generate the number of the symbol using that counter 100. The other input to adder 160 is the output of the stack 158. The word selected is determined by the signal on lead 174. The signal on lead 174 gives the number of the symbol being generated by the ROM 156.

When a symbol of lower priority is to be generated or the symbol generator has finished generating a symbol, a new address is generated on lead 124 by means of priority encoder 168. Whenever there is a change in address on lead 172, the current output on lead 176 of the address 160 is loaded in stack 158 at the address of the old symbol.

Referring to FIG. 21, there is illustrated another embodiment of a symbol generator. FIG. 22 shows an arbitrary symbol which may be generated. The symbol could be divided into two parts by the center line Q. The center line Q does not have to pass through the center of the symbol, its purpose is to act as a reference point in the generation of the symbol. Each section A, B of the symbol is bounded by an envelope. This envelope determines the geometric shape of the symbol.

The symbols generated by this type of symbol generator are solids, i.e., they do not have enclosed blanks.

FIG. 21 shows in block diagram the circuitry used for generating symbols suitable for a line scan display. It consists of a pattern generator 178, a left envelope generator 180, a right envelope generator 182, and a dot generator 184.

The envelope generators 180 and 182 generate the envelopes by the methods to be described, the pattern generator 178 takes as its input the output of the envelope generators 180 and 182 and performs the following operations on these outputs plus $x$, $y$ and height input to generate the necessary signals required by the dot generator 184.

$$E = x + aW_L + bW_R$$

$$F = cW_L + dW_R$$

$$G = y$$

$$H = h_o$$

where $a$, $b$, $c$, $d$, $h_o$ are constants. By varying these constants it is possible to generate different symbols from a basic envelope as shown in FIG. 23.

Figure 24:
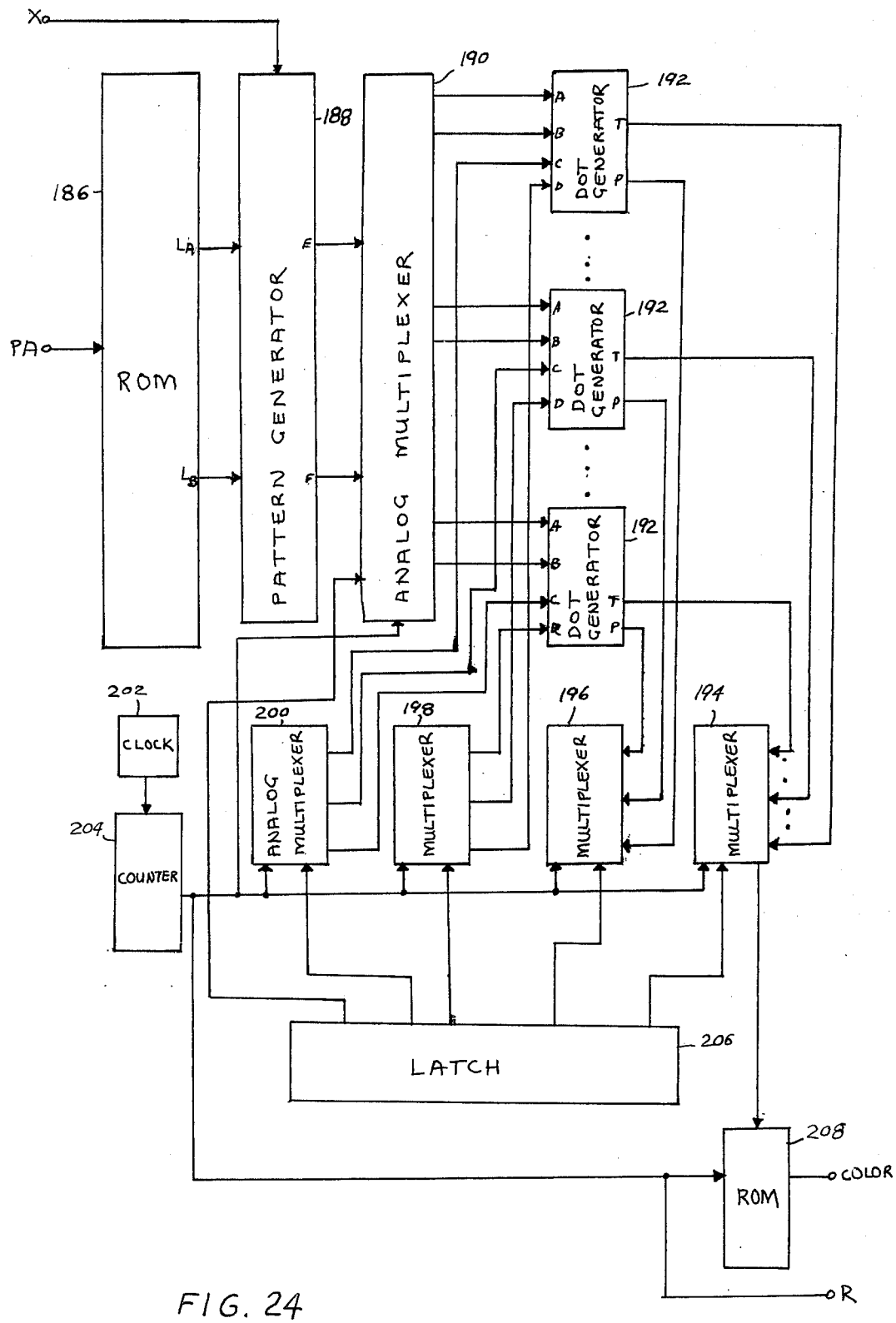
FIG. 24 is a block diagram of another symbol generator.

The envelope could be generated digitally using an ROM, as shown in FIG. 24, or using analog techniques.

With analog methods, function generators are used to generate the envelopes. Some commonly available function generators are triangular, sine wave and square wave generators. By using multi-variable function generators, or by combining the appropriate single function generators, and by varying the coefficients in the equations of the pattern generator, as shown in FIG. 23, it is possible to generate any arbitrary symbol.

Referring to FIG. 24, there is shown another embodiment of a symbol generator. It consists of a ROM 186, a pattern generator 188, an analog multiplexer 190, a generator 192, multiplexers 194, 196, 198 and 200, a clock 202, a counter 204, and a latch 206.

At the beginning of each frame, the computer 16 sets the $y$ signal of each symbol generator 22 by means of the analog multiplexer 200. The computer scans through all the $y$ inputs to the dot generator 192 by means of the clock 202, counter 204 and analog multiplexer 200.

At the beginning of each line, the computer 16 scans through all the dot generators 192 and for each dot generator active, the computer performs the following calculations:

$$cV = cV - 1$$

if $cV = 0$ then RESET else $(cx = cx-1$ if $xc = 0$ then $(cx = Vx\ PA = PA - HS))$ If no RESET, then the pattern generator 188 performs the following calculation:

$$E = x + L_A$$

$$F = L_B$$

the output of the pattern generator 188 is then connected to the proper dot generator by means of the analog multiplexer 190.

The pattern generator 188 could be implemented either as an analog circuit or as a digital circuit. If the symbol pattern generator 188 is implemented by a computer program, then the computer executes the program below:

$$E = x + L_A$$

$$F = L_B$$

The outputs E, F are then transformed to analog signals by means of digital-to-analog converters (D/A) and the output of the D/A's are then connected to the proper dot generator by means of the analog multiplexer 190.

If the pattern generator 188 is implemented as an analog circuit, then output of the ROM is connected to D/A which converts $L_A$ and $L_B$ into analog form. The pattern generator 188 would then perform the calculation above and the inputs connected to the proper dot generator by means of the analog multiplexer 190.

When there is a RESET, multiplexer 198 is enabled and the dot generator selected by the output of the counter 204 is reset to zero.

At the beginning of each clock, multiplexer 194 is enabled and all the outputs of the dot generators 192 are scanned. For every active output, counter 204 is connected to ROM 208 to read the color of the symbol.

Figure 25:
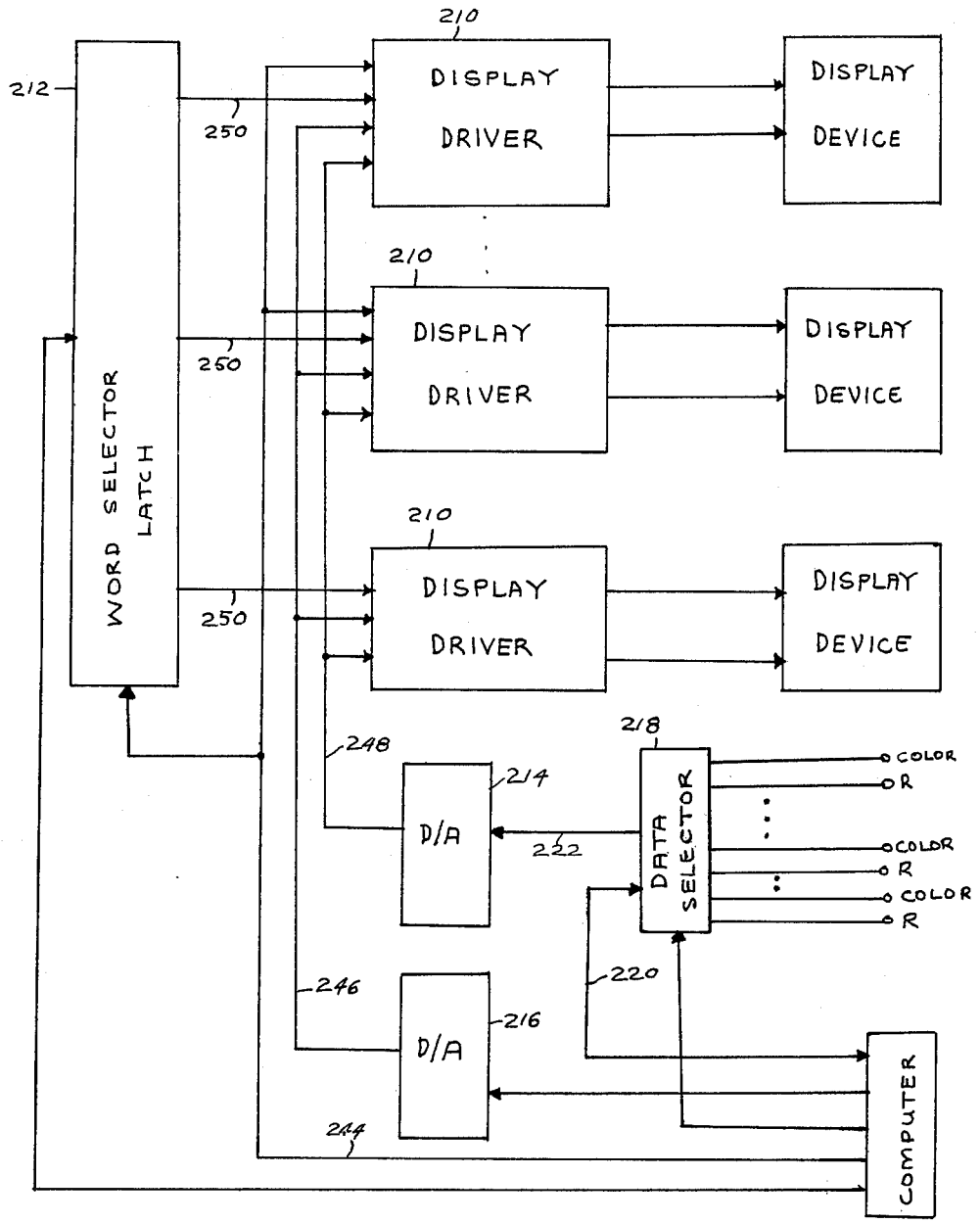
FIG. 25 is a block diagram of the video combiner, and, FIG. 26 is a block diagram of a summer made according to the invention.

FIG. 25 represents in block diagram an embodiment of the video combiner 24.

The basic theory of the operation of the video combiner 24 is as follows:

For every clock pulse, the computer scans the outputs of the active symbol generators in order of the priority of the current symbol being generated by each symbol generator. The color and intensity of each scanned symbol are connected to the appropriate display drivers by means of the word selector of each symbol. If a current symbol is opaque and no special effects are being performed, all display devices to which this symbol is connected are disabled until the end of the clock period. This is because it is not possible to see through opaque symbols and so there is no need for displaying symbols behind an opaque symbol.

The video combiner 24, as shown in FIG. 25, consists of display drivers 210, a latch 212, digital-to-analog converters (D/A) 214 and 216, and data selector 218. For each clock pulse, the computer scans the output of all the symbol generators by means of the data selector 218. For every active symbol, the output on a lead 220 is the symbol number. This is used to read the intensity I and selector word S. The selector word is loaded into the latch 212 and the intensity I is connected to the D/A converter 216. The output on a lead 222 of the data selector 218 is the color of the symbol at that location. This is connected to the D/A converter 214. The outputs of the D/A converters 214 and 216 are connected to the appropriate display driver 210 by means of control information from the latch 212. A one at bit location $i$ of latch 212 means the current symbol could be displayed on display device $i$. The output of latch 212 is used to control the switches which connect the outputs of the D/A converters 214 and 216 to the display driver 210. The computer 16 also checks for opaque symbols. If a current symbol is opaque and no special effects are being performed, then all the display drivers to which this symbol is connected are disabled for the rest of this clock period. This is achieved by loading a zero at the latch position corresponding to the appropriate display drivers.

The display driver 210 consists of a number of summers 224. The number of summers per display driver is dependent on how the color information is coded. By way of explanation, any color has three characteristics needed to specify the visual information. These characteristics are hue or tint, which is what is generally called color. Second is its saturation which indicates how concentrated, vivid, or intense the color is and, lastly, its luminance which indicates the brightness or what shade of gray the color would be in black and white. The hue or tint is made up of three primary colors — red, green, blue. By combining these colors in different proportions, it is possible to generate any color. In this design, one of the parameters selected is the intensity or the luminance. The way the other properties are encoded is dependent on the type of display device on which it is desired to display the symbol.

Figure 26:
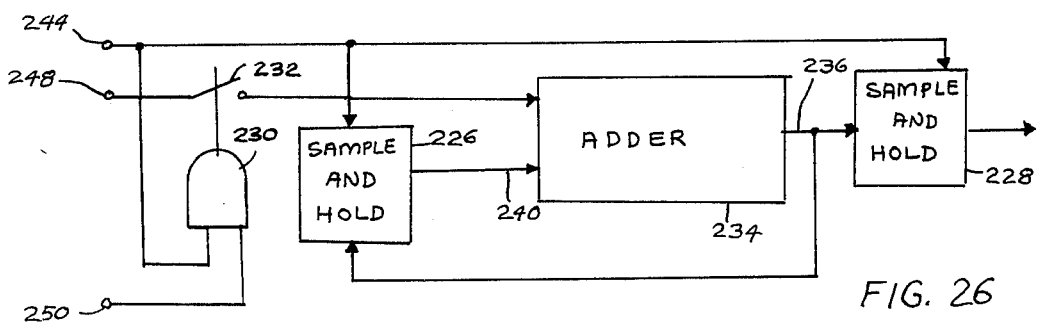

The preferred embodiment of the summer 114, as shown in FIG. 26, consists of sample and hold circuits 226 and 228, AND gate 230, switch 232 and an adder 234. At the beginning of each clock pulse, outputs on lead 236 of summer 234 are stored in the sample and hold circuit 228 and the sample and hold circuit 226 and is initialized usually to zero. For every clock, adder 234 and the sample and hold circuit 226 add all the outputs of all the symbols which are to be displayed at that location of the display device, as follows. The clock used to scan the symbol generators is in two phases. The first phase adds the contents at lead 238 and the output on lead 240 of the sample and hold circuit 226. The second phase stores the output on lead 236 of the summer 234 in the sample and hold circuit 226. The input on lead 242 of AND gate 230 determines whether the current symbol should be displayed on this display device. The signal on lead 242 comes from the output of the word selector latch 212.

Having thus described the invention, what I claim and desire to obtain by Letters Patent of the United States is:

1. A system for converting coded data signals for presentation as display symbols on a display device comprising
   (a) an input computer adapted to store three-dimensional data with respect to a symbol to be displayed and generate signals corresponding to a two-dimensional display representation of said symbol,
   (b) symbol defining means connected to and providing input data to said input computer,
   (c) a display computer connected to and receiving the output of said input computer, (d) at least one dot generator connected to said display computer and controlled thereby, said dot generator adapted to generate a dot producing signal at the beginning of the horizontal position of each symbol,
(e) at least one symbol generator connected to said generator and to said display computer and adapted to generate symbol producing signals at locations indicated by said dot generator, and,
(f) a video combiner connected to said symbol generator and to said display computer for processing said symbol producing signals and delivering them to a selected display device,
(g) said dot generator including $x$ and $y$ comparators and $x$ and $y$ stacks operatively connected to one another and to said display computer, said $x$ and $y$ comparators receiving, respectively, $x$ and $y$ counts corresponding to the $x$ and $y$ addresses of said symbols.

2. A system, according to claim 1, wherein said symbol generator includes at least first and second counters, a latch and a read only memory operatively connected to one another, said first counter receiving signals corresponding to the dimensions of said symbol, said second counter receiving the output of said first counter and signals corresponding to the address of said symbol, said latch receiving signals corresponding to the number of said symbol, said read only memory receiving the output of said second counter.

3. A system, according to claim 1, wherein said video combiner includes at least one display driver, at least one digital to analog converter connected to said driver and providing inputs thereto, a data selector connected to said converter and receiving color signals with respect to said symbol and a word selector latch connected to said driver and to said computer, said driver providing inputs to said display device.

* * * * *